3,076,824
21-FLUOROACETYLALLO-PREGNANE-3β-OL-20-ONE AND DERIVATIVES THEREOF
Marcel Harnik, Morristown, Tenn., assignor to Chemetron Corporation, Chicago, Ill., a corporation of Delaware
No Drawing. Filed June 20, 1961, Ser. No. 127,776
8 Claims. (Cl. 260—397.4)

This invention relates to allopregnane compounds of the following general formula and to the production thereof:

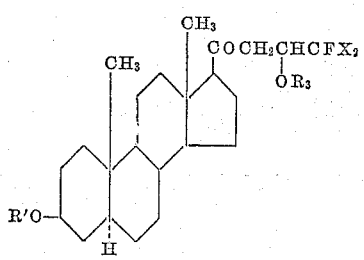

wherein X is hydrogen or fluorine; R is hydrogen, a lower alkyl radical or a lower alkanoyl radical; and R' is hydrogen, a lower alkyl or a lower alkanoyl radical.

The compounds of this invention have adrenocortical activity and are useful in the relief of inflammation of rheumatoid arthritis and similar collagen and allergic conditions. They have particular utility in inducing thymolytic corticoid activity in mammals and can be applied parenterally in aqueous suspensions or in innocuous organic solvents. They are thus useful in supplementing the cortical hormone production of mammals without the side effects of the progestational hormones. These compounds are also useful as intermediates in the synthesis of adrenocorticoid compounds.

In the compounds of the foregoing formula, R and R' can represent hydrogen or lower alkyl radicals, such as methyl, ethyl, propyl, isopropyl, or butyl radicals, or lower alkanoyl radicals such as formyl, acetyl, propionyl or butyryl radicals.

It is an object of this invention to provide new allopregnane compounds which have useful physiological activity. It is a further object to provide efficient methods for producing such compounds from available steroids. Another object is to provide allopragnane compounds having fluorinated alkyl radicals in the 21-position which are useful as adrenocorticoids. These and other objects are apparent from and are achieved in accordance with the following disclosure.

The compounds of this invention are produced from pregnenolone. The first step is the condensation of pregnenolone with an alkyl ester of trifluoroacetic acid, of difluoroacetic acid or of monofluoroacetic acid in the presence of an alkaline condensing agent such as an alkali metal hydride or an alkali metal alkoxide in an inert solvent. The condensation is preferably conducted in a nonoxidizing atmosphere at a temperature in the range of 50–150° C. By this procedure a trifluoroacetyl, difluoroacetyl or monofluoroacetyl radical is introduced at the 21-position of pregnenolone. The tri-, di- or monofluoroacetylpregnenolone is then reacted with an alkanoic acid anhydride, preferably in the presence of a basic solvent such as pyridine, quinoline or dimethylaniline, to form an enol alkanoate from the β-diketone which is formed by the introduction of the substituted acetyl radical at the 21-position of the pregnenolone. The enol alkanoate is hydrogenated in the presence of a noble metal catalyst whereby the double bond at the 5,6-position and the double bond at the 21-position are reduced, thereby forming alkanoic acid esters of the steroids shown in the general formula above.

In an alternative procedure, the 21-tri- (or di- or mono-) fluoroacetylpregnenolone is hydrogenated in the presence of a noble metal catalyst, whereby the carbonyl radical of the substituted acetyl radical in the 21-position is reduced to a hydroxymethylene radical and the double bond at the 5,6-position is also reduced, thereby forming a steroid of the type shown in the general formula above having a hydroxyl radical in the side chain. Esters and ethers of such hydroxyl radicals can be produced by methods disclosed herein.

The invention is disclosed in further detail by means of the following examples which are provided to illustrate the invention without limiting it thereto. It will be apparent to those skilled in the art that various modifications in reaction conditions, reagents and equivalent materials can be made without departing from the invention herein disclosed.

EXAMPLE 1

*21-Trifluoroacetyl-5-Pregnene-3β-Ol-20-One*

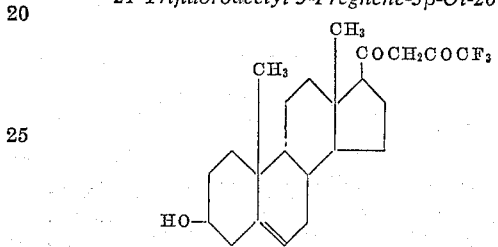

A. A mixture of 2.717 g. of 5-pregnene-3β-ol-20-one, 2.006 g. of sodium hydride, 50 ml. of dry benzene and 5 ml. of ethyl trifluoroacetate was refluxed with stirring under nitrogen. After 10 minutes a heavy white gum covered the sides of the flask and stirring had to be stopped, but reflux was continued for an hour. The reaction mixture was decomposed with methanol and then 5% hydrochloric acid. The benzene layer was washed with water and with saturated NaCl solution, dried and evaporated. The oily residue of 21-trifluoroactyl-5-pregnene-3β-ol-20-one was dissolved in ether and shaken with 5% KOH solution. The emulsion which formed was diluted with 1 liter of water and the gelatinous precipitate of the potassium salt of 21-trifluoroacetyl-5-pregnene-3β-ol-20-one was collected on a filter.

B. A mixture of 20 g. of 5-pregnene-3β-ol-20-one, 8 g. of sodium methoxide, 300 ml. of dry benzene and 15 ml. of ethyl trifluoroacetate was refluxed for 1¼ hours with stirring. After 25 minutes the mixture became clear and shortly afterwards a thick solid began to precipitate. The mixture was cooled, decomposed with ice and 5% hydrochloric acid and stirred for 10 minutes. The benzene phase was washed with water and with saturated NaCl solution, dried and evaporated to dryness. The almost colorless residue of 21-trifluoroacetyl-5-pregnene-3β-ol-20-one crystallized readily; yield 95%. The product had M.P. 130–131.5° C. Its I.R. absorption spectrum (KBr) had peaks at 3.11 and 6.22 microns.

EXAMPLE 2

*21-(2,2,2-Trifluoro-1-Hydroxyethylidene)-5-Pregnene-3β-Ol-20-One Diacetate*

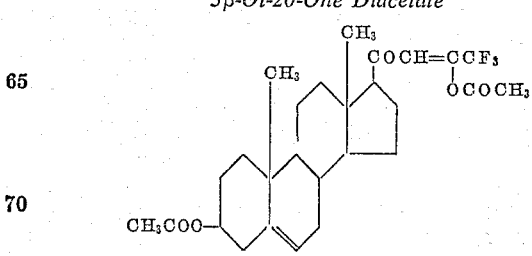

3,095 grams of 21-trifluoroacetyl-5-pregnene-3β-ol-20-one in 25 ml. of pyridine and 25 ml. of acetic anhydride was kept at room temperature for 21 hours. Then the solution was evaporated in vacuo to dryness and the residue of 21-(2,2,2-trifluoro-1-hydroxyethylidene)-5-pregnene-3β-ol-20-one was crystallized by trituration in cold methanol; yield 1.936 g.; M.P. 164–166° C. Recrystalization from ethyl acetate-methanol gave M.P. 169–169.5° C. The I.R. absorption spectrum (in KBr) had peaks at 5.59, 5.67, 5.77 and 5.95 microns, indicating trifluoroacetoxyethylidene, $CF_3$—C=C—CO— and acetoxy groups. The U.V. absorption spectrum had a maximum at 257 millimicrons (E=29,200) and a minimum at 216 millimicrons (E=5,120).

EXAMPLE 3

*21-(2,2,2-Trifluoro-1-Hydroxyethyl)Allopregnane-3β-Ol-20-One Diacetate*

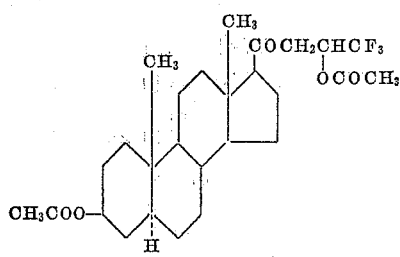

A solution of 2.000 g. of 21(-2,2,2-trifluoro-1-hydroxyethylidene)-5-pregnene-3β-ol-20-one diacetate in 75 ml. of ethyl acetate was hydrogenated at atmospheric pressure and temperature in the presence of 1.002 g. of 5% palladium-charcoal catalyst for 18 hours. The reaction mixture was filtered and the filtrate evaporated in vacuo. The residue of 21-(2,2,2-trifluoro-1-hydroxyethyl)allopregnene-3β-ol-20-one diacetate was chromatographed on 50 g. of magnesium silicate. Elution with 600 ml. of benzene and with 150 ml. of ether followed by evaporation of the combined eluates gave 501 mg. of crystalline 21 - (2,2,2 - trifluoro-1-hydroxyethyl)allopregnene-3β-ol-20-one diacetate, M.P. 168–179° C. On recrystallization from methanol-chloroform and from ethyl acetate, the product melted at 181.5–182.5° C. The I.R. absorption spectrum (KBr) showed peaks at 5.60, 5.74 and 5.89 microns. The tetranitromethane test was negative and the U.V. absorption spectrum showed no specific absorption.

A second crop of 483 mg. of crystals was obtained from the filtrate of the crystals of M.P. 168–179° C. described above. These crystals were diluted with 1 ml. of methanol and refrigerated for 16 hours. The product so obtained melted at 119–125° C. and on recrystallization from methanol the melting point was raised to 128–129° C.. This product is an isomer of 21-(2,2,2-trifluoro-1-hydroxyethyl)allopregnene-3β-ol-20-one diacetate. Its I.R. absorption spectrum had peaks at 5.61, 5.71 and 5.74 microns, the tetranitromethane test was negative and the U.V. spectrum showed no specific absorption.

EXAMPLE 3A

21 - (2,2,2 - trifluoro-1-hydroxyethyl)allopregnane-3β-ol-20-one diacetate was also produced by acetylation of 21 - (2,2,2 - trifluoro-1-hydroxyethyl)allopregnane-3β-ol-20-one by the following procedure: 5.84 g. of 21-(2,2,2-trifluoro - 1-hydroxyethyl)allopregnane-3β-ol-20-one was dissolved in 44 ml. of pyridine and 44 ml. of acetic anhydride. The solution was kept at room temperature overnight, then cooled in ice and diluted with ice. A light orange oil separated and crystallized on standing. This was separated, washed with water and recrystallized from methanol. The 21-(2,2,2-trifluoro-1-hydroxyethyl)allopregnane-3β-ol-20-one diacetate so obtained had M.P. 124.5–126° C.

EXAMPLE 4

*21-Difluoroacetyl-5-Pregnene-3β-Ol-20-One*

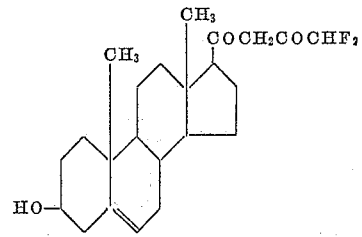

A mixture of 100 g. of 5-pregnene-3β-ol-20-one, 1500 ml. of dry benzene, 40 g. of sodium methoxide and 75 ml. of ethyl difluoroacetate was stirred and refluxed for 75 minutes. The mixture was cooled and acidified with 5% hydrochloric acid. The benzene phase was washed with water and with saturated NaCl solution, dried and evaporated, yielding 101 g. of solid. This was recrystallized from heptane, yielding 68.5 g. of 21-difluoroacetyl-5-pregnene-3β-ol-20-one of M.P. 147–149.5° C. Further recrystallization raised the M.P. to 148–149.5° C. The I.R. absorption spectrum (in KBr) had peaks at 2.85 and 6.20 microns, the U.V. absorption spectrum had a maximum at 292 millimicrons (E=7950) and the optical rotation in chloroform was $[\alpha]_D^{25}$ +33°.

EXAMPLE 5

*21-Difluoroacetyl-5-Pregnene-3β-Ol-20-One Acetate*

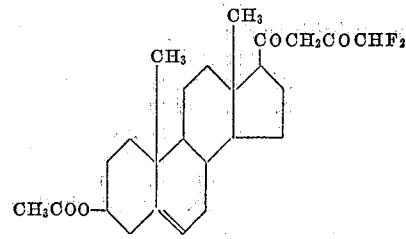

A solution of 45 g. of 21-difluoroacetyl-5-pregnene-3β-ol-20-one in 200 ml. of pyridine and 200 ml. of acetic anhydride was allowed to stand at room temperature 16 hours. On addition of ice and water crystalline 21-difluoroacetyl-5-pregnene-3β-ol-20-one acetate precipitated. It was separated, washed with water and air dried; yield 53.4 g., M.P. 106–109° C. Recrystallization from methanol gave M.P. 98–100.5° C. The I.R. absorption spectrum showed peaks at 5.76 and 6.08–6.22 microns, indicating acetylation in the 3-position only. The optical rotation in chloroform was $[\alpha]_D^{25}$ +32°.

EXAMPLE 6

*21-(2,2,Difluoro-1-Hydroxyethyl)Allopregnane-3β-Ol 3-Acetate*

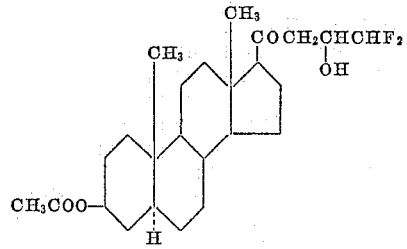

A solution of 10.24 g. of 21-difluoroacetyl-5-pregnene-3β-ol-20-one acetate in 200 ml. of methanol was hydrogenated at 40–50 p.s.i.g. at room temperature in the presence of 5 g. of 5% palladium-charcoal catalyst. The catalyst was removed and the solution evaporated. The crystalline residue of 21-(2,2-difluoro-1-hydroxyethyl)allopregnane-3β-ol 3-acetate was recrystallized from 67% aqueous methanol; yield 6.8 g., M.P. 117–124° C. Further recrystallization from aqueous methanol gave M.P. 125–127.5° C.

EXAMPLE 7

*21-Trifluoroacetylallopregnane-3β-Ol-20-One*

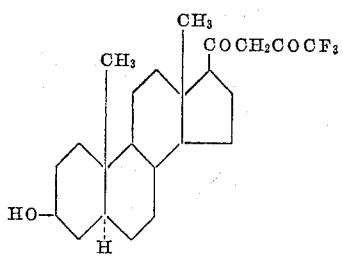

5 grams of 5-pregnene-3β-ol-20-one in 50 ml. of glacial acetic acid was hydrogenated for 4 hours at atmospheric pressure and temperature in the presence of 2 g. of 5% palladium-charcoal catalyst. The reaction mixture was filtered and the filtrate evaporated in vacuo to dryness. The crystalline residue of allopregnane-3β-ol-20-one was recrystallized from ethanol; yield 6.34 g., M.P. 180–190° C. Recrystallization from ethyl acetate gave allopregnane-3β-ol-20-one of M.P. 193–196° C. The I.R. absorption spectrum had peaks at 5.83 and 5.90 mcirons.

7.22 grams of allopregnane-3β-ol-20-one, 120 ml. of dry benzene, 4 g. of sodium methoxide and 6 ml. of ethyl trifluoroacetate were mixed and refluxed. The reagents immediately formed a clear solution and after about 5 minutes a precipitate began to form. At the end of 80 minutes the mixture was cooled, treated with ice and 5% hydrochloric acid, and stirred for 10 minutes. The benzene layer was separated, washed with water and with saturated NaCl solution and evaporated to dryness. The crystalline residue of 21-trifluoroacetyl-allopregnane-3β-ol-20-one was recrystallized from heptane; yield 7.5 g., M.P. 150.5–152° C. The I.R. absorption spectrum (KBr) had peaks at 3.08, 6.14 and 6.29 microns.

EXAMPLE 8

*21-(2,2,2-Trifluoro-1-Hydroxyethyl)allopregnane-3β-Ol-20-One 3-Acetate*

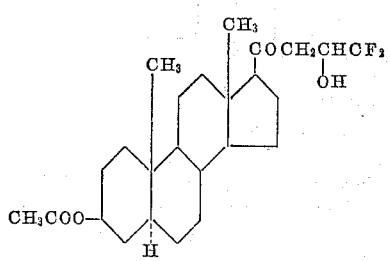

2.000 g. of 21-trifluoroacetylallopregnane-3β-ol-20-one in 70 ml. of methanol was hydrogenated in the presence of 0.5 g. of 5% palladium-charcoal catalyst at 40–50 p.s.i.g. for 4½ hours. The reaction mixture was filtered and the filtrate evaporated in vacuo. The residue of 21 - (2,2,2 - trifluoro - 1 - hydroxyethyl)allopregnane-3β-ol-20-one was dissolved in 15 ml. of acetic anhydride and 15 ml. of pyridine and kept at room temperature for 15 hours. The reaction mixture was evaporated to dryness in vacuo and the oily residue was chromatographed on a column of 30 g. of alumina. The column was eluted with 200 ml. of hexane, 680 ml. of hexane-benzene (1:1), 320 ml. of benzene and 280 ml. of benzene-ether (4:1). The benzene-ether eluate was evaporated and the residue crystallized on scratching. This material was washed with pentane and dried; yield 240 mg., M.P. 131.5–136.5° C. Recrystallization from hexane gave plates of 21-(2,2,2-trifluoro-1-hydroxyethyl)-allopregnane-3β-ol-20-one 3-acetate of M.P. 140–141° C. The I.R. absorption spectrum (KBr) had peaks at 2.94 and 5.81 microns. The optical rotation in chloroform was $[\alpha]_D^{25}$ +61°.

EXAMPLE 9

*21-(2,2,2-Trifluoro-1-Hydroxyethyl)allopregnane-3β-Ol-20-One Diacetate*

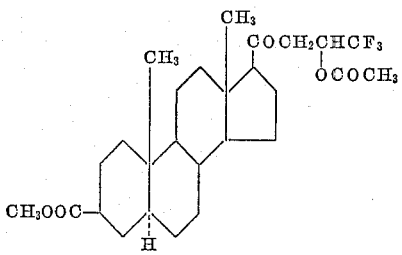

58 mg. of 21-(2,2,2-trifluoro-1-hydroxyethyl)allopregnane-3β-ol-20-one 3-acetate was dissolved in 1 ml. of pyridine and 1 ml. of acetic anhydride. After 16 hours at room temperature the reaction mixture was diluted with cold water and the precipitate of 21-(2,2,2-trifluoro-1-hydroxyethyl)allopregnane-3β-ol-20-one diacetate was recrystallized from methanol. The diacetate had M.P. 127.5–128.5° C. Its I.R. absorption spectrum had carbonyl peaks at 5.65, 5.79 and 5.85 microns. The tetranitromethane test was negative.

EXAMPLE 10

*21-(2,2,2-Trifluoro-1-Hydroxyethylidene)allopregnane-3β-Ol-20-One Diacetate*

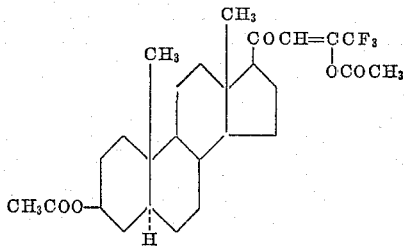

A solution of 2.173 g. of 21-trifluoroacetylallopregnane-3β-ol-20-one in 8 ml. of pyridine and 8 ml. of acetic anhydride was kept at 25° C. for 15 hours, then diluted with ice and water and filtered. The 21-(2,2,2-trifluoro-1-hydroxyethylidene)allopregnane-3β-ol-20-one diacetate thus isolated was recrystallized from ethyl acetate-methanol; yield 1.576 g., M.P. 184–185° C. Further recrystallization from ethyl acetate-methanol gave M.P. 185.5° C. The I.R. absorption spectrum had peaks at 5.57, 5.66, 5.78 and 5.91. The optical rotation was $[\alpha]_D^{25}$ +50°. The tetranitromethane test was positive.

EXAMPLE 11

*21-(2,2,2-Trifluoro-1-Hydroxyethyl)allopregnane-3β-Ol-20-One Diacetate*

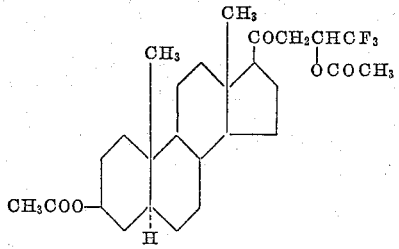

A solution of 0.963 g. of 21 - (2,2,2 - trifluoro - 1-hydroxyethylidene)allopregnane-3β-ol-20-one diacetate in 35 ml. of acetic acid was hydrogenated at atmospheric pressure and temperature for 2 hours with 1.1 g. of 5% palladium-charcoal catalyst. The reaction mixture was filtered and evaporated and the gummy residue was treated with 5 ml. of methanol. A crystalline deposit of 21 - (2,2,2 - trifluoro - 1 - hydroxyethyl)allopregnane-3β-ol-20-one diacetate formed and was separated by filtration, washed with methanol and dried; yield 160 mg., M.P. 171–179° C. After recrystallization from ethyl acetate the product melted at 181.5–182.5° C. and was identical to the first isomer of 21-(2,2,2-trifluoro-1-hydroxyethyl)allopregnane-3β-ol-20-one diacetate of Example 3.

The original methanol filtrate produced above deposited 150 mg. of crystals on standing about a day at room temperature. These were recrystallized from methanol and melted at 126–128° C. The I.R. absorption spectrum was identical to that of the second isomer of 21 - (2,2,2 - trifluoro - 1 - hydroxyethyl)allopregnane-3β-ol-20-one diacetate of Example 3.

EXAMPLE 12

*21-(2,2,2-Trifluoro-1-Hydroxyethyl)allopregnane-3β-Ol-20-One*

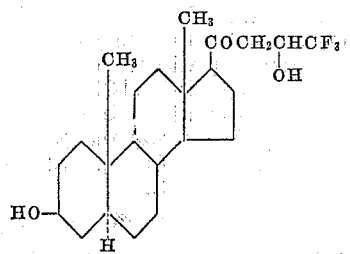

A mixture of 12.2 g. of 21-trifluoroacetylallopregnane-3β-ol-20-one, 200 ml. of methanol and 5 g. of 5% palladium-charcoal catalyst was hydrogenated at 40–50 p.s.i.g. for 4 hours. The reaction mixture was filtered and evaporated. The residue was taken up in ethyl acetate and the solvent displaced with heptane. On standing at room temperature, 7.77 g. of 21-(2,2,2-trifluoro-1-hydroxyethyl)allopregnane-3β-ol-20-one of M.P. 150–154° C. precipitated. On recrystallization from ethyl acetate-heptane the product melted at 158–159° C.

EXAMPLE 13

*21-(2,2,2-Trifluoro-1-Methoxyethyl)allopregnane-3β-Ol-20-One Acetate*

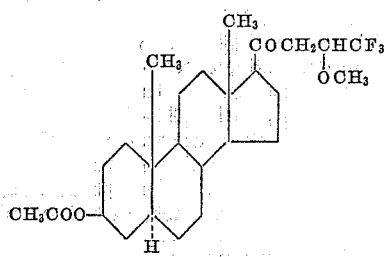

To a solution of 2.2 g. of 21-(2,2,2-trifluoro-1-hydroxyethyl)allopregnane-3β-ol-20-one diacetate (Example 3) in 220 ml. of warm methanol was added a solution of 2.2 g. of potassium bicarbonate in 22.0 ml. of water. Stirring and heating for 15 minutes effected solution of the reagents. The solution was kept at room temperature for 48 hours, then acidified with 3 ml. of acetic acid. The solvent was removed in vacuo on the steam bath and the aqueous residue was chilled with ice and extracted with ether. The ether phase was separated, washed with 5% potassium bicarbonate solution, dried and evaporated. The residue of oily 21-(2,2,2-trifluoro-1-methoxyethyl)-allopregnane-3β-ol-20-one acetate was chromatographed on magnesium silicate (Florisil). Elution with benzene-hexane (1:1) yielded 614 mg. of solid 21-(2,2,2-trifluoro-1-methoxyethyl)allopregnane-3β-ol-20-one acetate. After recrystallization from heptane this product had M.P. 135–136° C. Its infrared absorption spectrum had peaks at 5.80 and 5.86 microns. Further recrystallization from heptane raised the M.P. to 138–139° C.

EXAMPLE 14

*21-(2,2,2-Trifluoro-1-Methoxyethyl)allopregnane-3β-Ol-20-One*

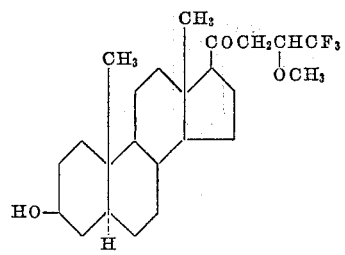

One gram of 21-(2,2,2-trifluoro-1-methoxyethyl)allopregnane-3β-ol-20-one acetate was dissolved in 52 ml. of 5% methanolic KOH solution and the resulting solution allowed to stand at room temperature for 1½ hours. The solution was diluted with water and extracted with ether. The ether extract was washed with water, dried and evaporated. The residue of 21-(2,2,2-trifluoro-1-methoxyethyl)allopregnane-3β-ol-20-one was recrystallized from heptane; yield 450 mg., M.P. 113–117° C. Further recrystallization raised the M.P. to 118.5–119° C.

A solution of 300 mg. of 21-(2,2,2-trifluoro-1-methoxyethyl)allopregnane-3β-ol-20-one in 10 ml. of pyridine and 10 ml. of acetic anhydride was kept at room temperature overnight. The solution was diluted with water and extracted with ether. The ether extract was washed with dilute hydrochloric acid and with water, dried and evaporated. The residue of 21-(2,2,2-trifluoro-1-methoxyethyl)allopregnane-3β-ol-20-one acetate was crystallized from heptane; M.P. 135–136° C.

What is claimed as new and desired to be secured by Letters Patent of the United States is:

1. An allopregnane compound of the formula

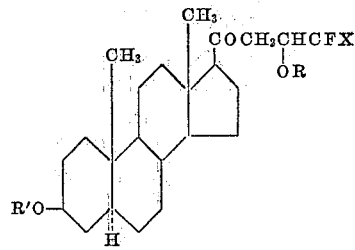

wherein X is a member of the group consisting of hydrogen and fluorine; R is a member of the group consisting of hydrogen, lower alkanoyl and lower alkyl radicals; and R' is a member of the group consisting of hydrogen, lower alkyl and lower alkanoyl radicals.

2. A compound as defined by claim 1 wherein X is fluorine, R is acetyl and R' is acetyl.

3. A compound as defined by claim 1 wherein X is fluorine, R is hydrogen and R' is acetyl.

4. A compound as defined by claim 1 wherein X is fluorine and R and R' are hydrogen.

5. A compound as defined by claim 1 wherein one X is hydrogen and one X is fluorine, R is hydrogen and R' is acetyl.

6. A compound as defined by claim 1 wherein X is hydrogen and R and R' are hydrogen.

7. A compound defined by claim 2 wherein X is fluorine, R is methyl and R' is acetyl.

8. A compound as defined by claim 2 wherein X is fluorine, R is methyl and R' is hydrogen.

No references cited.